(12) United States Patent
Giana

(10) Patent No.: US 6,220,426 B1
(45) Date of Patent: Apr. 24, 2001

(54) MOBILE ITEM-SORTING UNIT HAVING AN ENDLESS BELT PROVIDED WITH AN ITEM-RESTRAINING CURB STRUCTURE

(75) Inventor: Erminio Giana, Magnago-MI (IT)

(73) Assignee: CML Handing Technology S.p.A., Lonate Pozzolo (IT)

( * ) Notice: Subject to any disclaimer, the term of this patent is extended or adjusted under 35 U.S.C. 154(b) by 0 days.

(21) Appl. No.: 09/332,594

(22) Filed: Jun. 14, 1999

(30) Foreign Application Priority Data

Jun. 12, 1998 (IT) ............................. MI98A01341

(51) Int. Cl.[7] ................................................ B65G 15/08
(52) U.S. Cl. ...................... 198/818; 198/844.1; 198/847
(58) Field of Search ........................... 198/348, 369.1, 198/369.5, 818, 844.1, 847; 209/917

(56) References Cited

U.S. PATENT DOCUMENTS

| | | | |
|---|---|---|---|
| 1,484,248 | * 3/2000 | Austin | 198/847 |
| 2,334,384 | * 11/1943 | Cohen | 198/369.5 |
| 3,129,806 | * 4/1964 | Stiltner | 198/847 |
| 3,175,402 | * 3/1965 | Higami et al. | 198/369.7 |
| 3,231,068 | 1/1966 | Harrison et al. | . |
| 3,616,832 | * 12/1969 | Shima et al. | 198/847 |
| 5,288,194 | 2/1994 | Ueda et al. | . |

FOREIGN PATENT DOCUMENTS

| | | | |
|---|---|---|---|
| 1 070 222 | 7/1954 | (FR) | . |
| 1 446 474 | 10/1966 | (FR) | . |
| 1 542 285 | 10/1968 | (FR) | . |
| 2 140 371 | 11/1984 | (GB) | . |
| 571882 | * 10/1957 | (IT) | 198/818 X |

* cited by examiner

Primary Examiner—Christopher P. Ellis
Assistant Examiner—Kenneth W Bower
(74) Attorney, Agent, or Firm—Burns, Doane, Swecker & Mathis, L.L.P.

(57) ABSTRACT

An item-sorting unit includes a mobile frame movable in a direction of motion, and a driven endless belt mounted on the frame for rotation in a cross direction extending transversely relative to the direction of frame motion. An outer surface of the belt includes one or more upstanding curbs extending parallel to the cross direction. The curb(s) is formed of a flexible high-friction material and functions to resist movement of carried items relative to the belt.

6 Claims, 3 Drawing Sheets

MOBILE ITEM-SORTING UNIT HAVING AN ENDLESS BELT PROVIDED WITH AN ITEM-RESTRAINING CURB STRUCTURE

BACKGROUND OF THE INVENTION

This invention relates to a belt for a sorting machine unit of the so-called "cross-belt" type.

The industrial item sorting sector utilizes sorting machines employing various technologies, such as machines equipped with pushers, tilting dishes, etc.

Other known machines are of the "cross-belt" type, which comprise a small endless conveyor belt or mat installed on a trolley serving as a item carrier and sorting unit, where the said belt is actuated to move in a direction perpendicular to the forward motion of the sorting unit.

The systems based on a "cross-belt" technology enjoy an ever-growing diffusion, thanks to their high productivity coupled with other advantages such as a limited encumbrance and high sorting precision.

Compared to other technologies, the "cross-belt" technology also allows handling an extremely broad range of items, thanks to the fact that the sorting functions are carried out in an active manner, by case-to-case changing of the various parameters such as the acceleration imparted to the item, its unloading time and velocity, depending on the characteristics of the items themselves, thus eliminating the imprecision of the machines based on different technologies, such as those of a tilting-dish type, which unload by gravity.

For the purpose of loading items on the belts of the carrying and sorting units, loading stations are generally provided. These consist of several independent conveyor belts, arranged at an oblique angle to the direction of motion of the sorting unit.

In practice, all these stations constitute the interface between the operators charged with the loading process and the sorting machine itself.

The modern technologies for loading the items include the use of electronic devices capable of automatically verifying the dimensions and characteristics of the items and calculating, for each of them, the optimum accelerations and transit velocities.

The control of the functionality of the loading station generally serves the purpose of assigning each item to a sorting unit, and positioning the item at the center of the belt of that unit.

This positioning step is most important for a favorable final result, as any items loaded in erroneous positions may cause jamming along the sorting path, with a resulting abnormal operation of the machine and damage to the items. The items may even fall off the sorting unit, or, as in the most common case, assume anomalous trajectories during the unloading phase at the destination, with a consequent jamming in the exit devices and/or with sorting errors.

Although the latest systems utilize highly sophisticated technologies and equipment to ensure a precise positioning of the items, some loading errors occasionally still occur, wherein "error" involves an inability of an item to find its ideal position on the sorting unit.

These errors are generally generated by the unpredictable behavior of certain objects, both during the loading phase and while passing from the loading station to the carrying and sorting mat or belt.

In order to minimize these shortcomings, the present state of the art resorts to the following devices:

when the introduction belt is inclined in a horizontal plane with respect to the direction of motion of the sorting unit, the item is loaded onto the still-moving sorting unit with a velocity vector including some components congruent with the forward velocity of the sorting unit, so that the item may be deposited on the belt at a relative velocity of essentially nil;

beside the path of the sorting machine, in front of the loading stations, some barriers are installed which prevent any objects with a low friction coefficient from being pushed off the sorting unit, in a direction perpendicular to the direction of motion of the unit;

some retaining curbs are installed on the sorting units, separate from the mat, to prevent any items with a low friction coefficient from sliding off in the direction of motion of the unit, and thus dropping off the unit in either the forward or rearward direction;

conveyor belts made of highly adherent materials are used, so as to reduce any undesirable effects when handling items with a low friction coefficient.

However, all of the expedients described above cannot always prevent the occurrence of anomalous situations, so that it occasionally still happens that some items are improperly positioned on the mats.

For example, limp items such as plastic bags of a large size with respect to the volume of their contents, tend to glide in the direction of motion of the machine, so that the use of any fixed banks on the carrying units may have negative effects.

The bags may in effect position themselves so as to partially pile up on the bank, which may in an unloading phase slow the item's motion by friction, thus adversely affecting its trajectory.

Moreover, the mats, friction coefficient varies in use due to the dirt accumulating on its surface or because of different conditions of humidity, with the result that the behavior of the items may in an unloading phase be affected even to a considerable extent.

Some known conveyor belts also carry a row of ledges arranged in a direction perpendicular to the direction of motion of the mat, i.e., parallel to the direction of motion of the sorting unit. These ledges are used when the conveyor belt is severely inclined, so as to prevent a slippage of the items being carried.

Other known rotating mats have a curb affixed to their lower (interior) surface (in contact with the supporting rollers), which curb slides in a groove provided in the supporting rollers and functions as a guide to keep the mat centered on the rollers.

SUMMARY OF THE INVENTION

This invention now offers to avoid all the shortcomings heretofore described, by eliminating the risk than an item may assume an erroneous position on the transport and sorting unit after loading, thus allowing one to take full advantage of the machine's performance.

For this purpose the invention envisions to provide each rotating mat with a curb made of a flexible material capable of adapting to the curvature assumed by the mat while passing over the support rollers.

BRIEF DESCRIPTION OF THE DRAWINGS

This invention will now be described in detail, for exemplifying and non-limiting purposes, with reference to the attached drawings.

DETAILED DESCRIPTION OF PREFERRED EMBODIMENTS OF THE INVENTION

Figure 1:
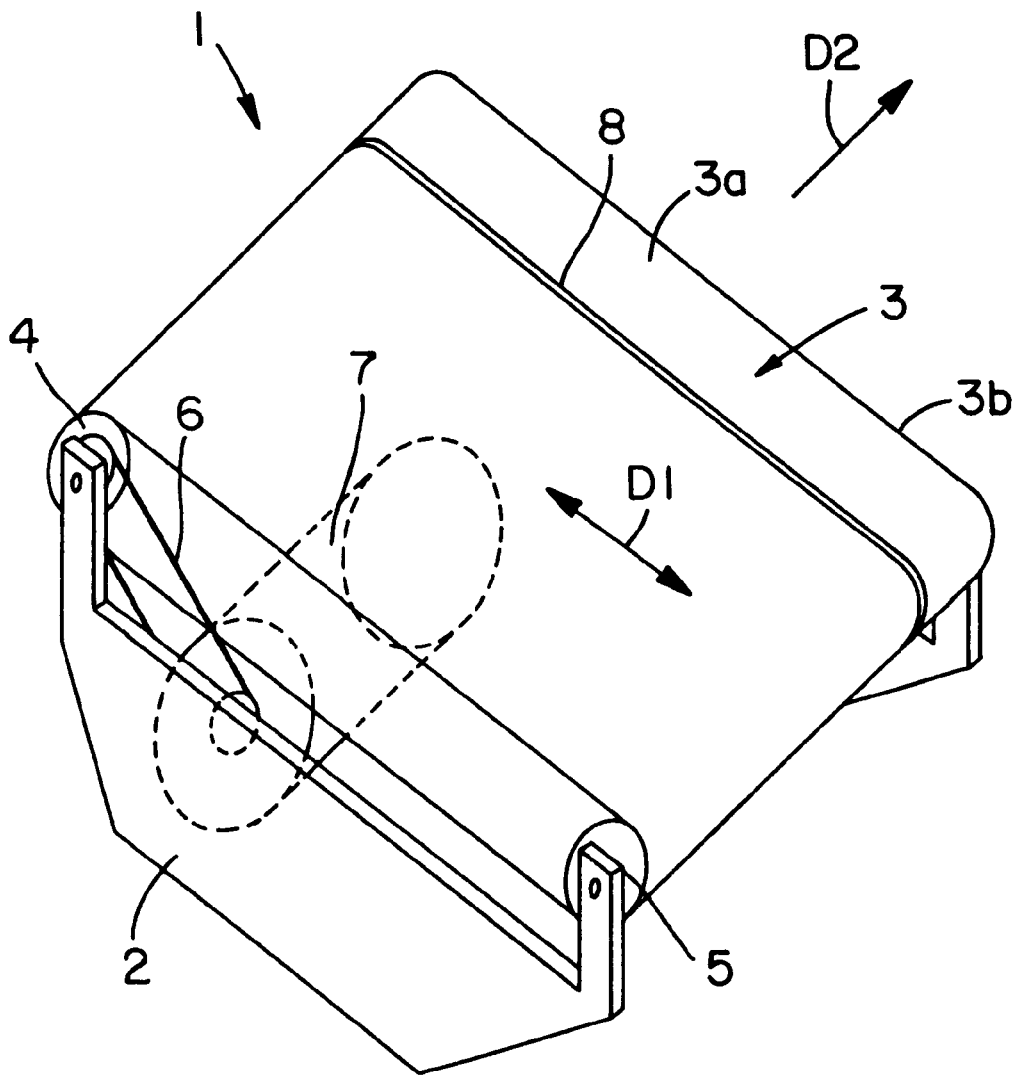
FIG. 1 is a simplified prospective view of a trolley with a belt according to the invention.
Figure 2:
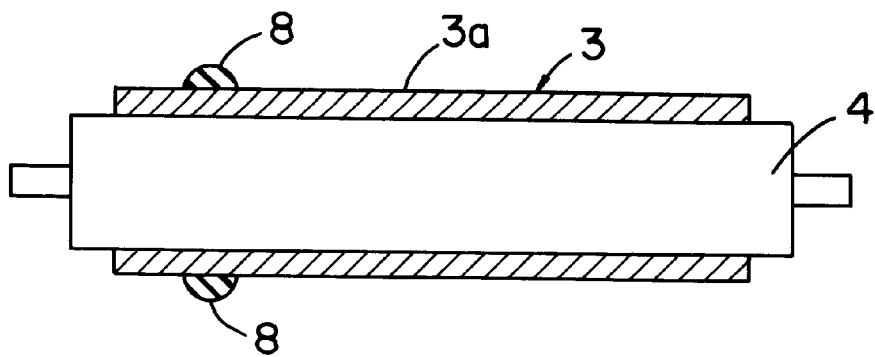
FIG. 2 is a cross-section of the trolley in FIG. 1.

FIG. 1 illustrates a carrying and sorting unit typical of the machines based an a "cross-belt" technology, consisting of a trolley 1 comprising a frame 2 mounting a rotating endless belt or mat 3. The belt 3 has an outwardly facing surface 3a which constitutes the carrying and sorting plane, and an inner surface which engages and wraps around a pair of support rollers 4 and 5. The rollers rotate about parallel horizontal axes.

The roller 4 is connected by a drive belt 6 to a motor 7 actuated whenever the belt must be moved transversely in the cross direction D1. In particular, the motor is actuated when: (i) an item in a loading phase passes from a loading station (not shown) to the unit 1, so as to receive the item while controlling its deceleration and achieving a loading at the center of the unit, or (ii) when an item must be loaded opposite the picking-up devices (not shown).

According to the invention, an upstanding profile or curb 8 is applied to the outer surface 3a of the mat 3, which curb is firmly affixed to the mat and rotates along with the same whenever the motor 7 is actuated. The curb 8 extends parallel to the cross direction D1, i.e. parallel to the endless direction of the belt.

The curb is made of a suitable flexible material having a high friction coefficient such as for instance rubber, silicone, PVC or any other suitable material, and has a height varying within a range of a few millimeters, depending on the application.

The curb may be applied to the mat by using a known technology, for instance directly (integrally) during the production of the belt or at a later stage, by vulcanizing, gluing or the like.

Figure 3:
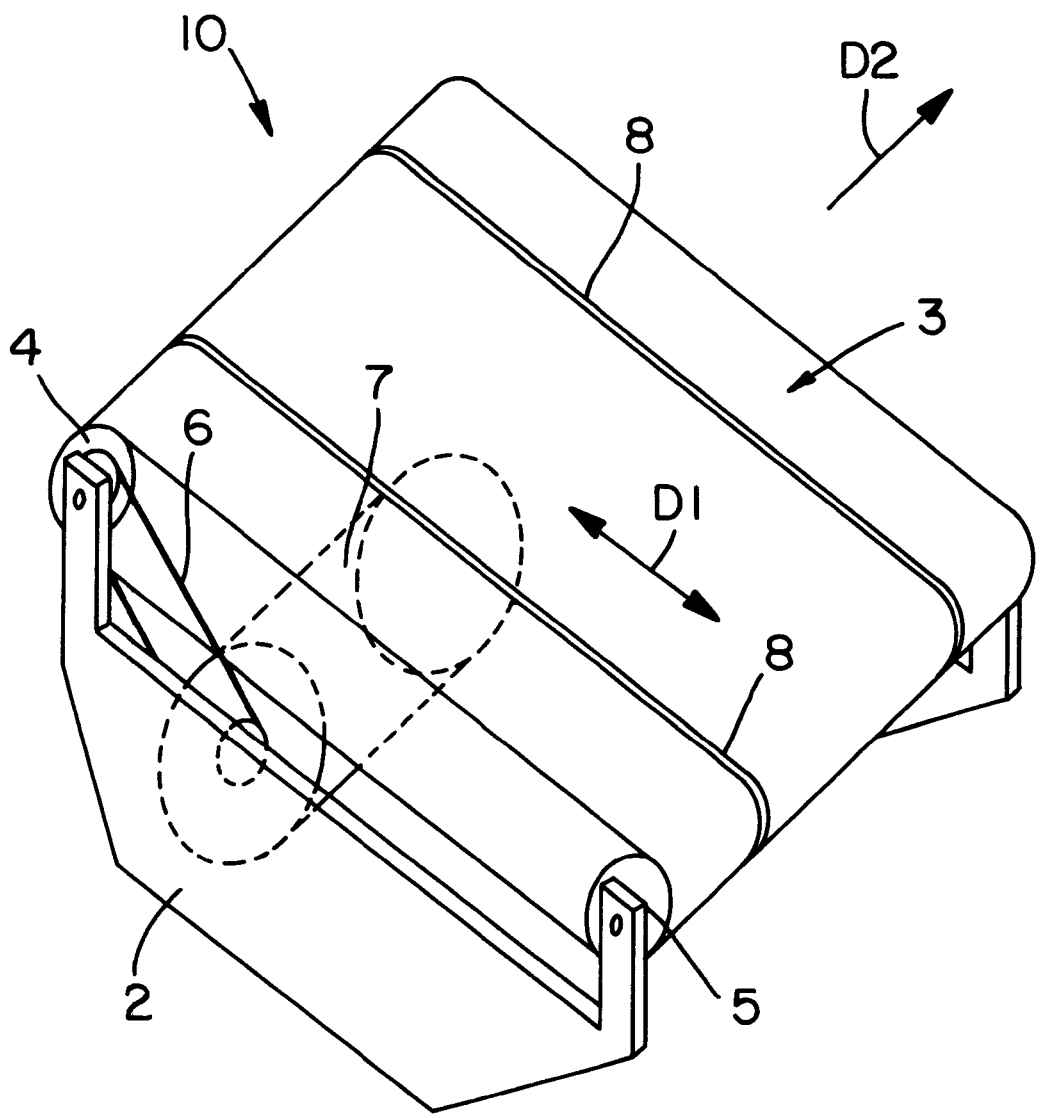
FIG. 3 is a simplified prospective view of a further preferred version of the invention.

Most applications envision the use of a curb having a thickness of a few millimeters, mounted parallel to a longitudinal side edge 3b of the mat, at a few centimeters' distance from the latter. Other cases envision the application of two curbs adjacent respective sides of the mat, as in the case of the unit 10 illustrated in FIG. 3, so as to prevent the item from slipping in either direction of the velocity vector of the sorting unit.

Figure 4:
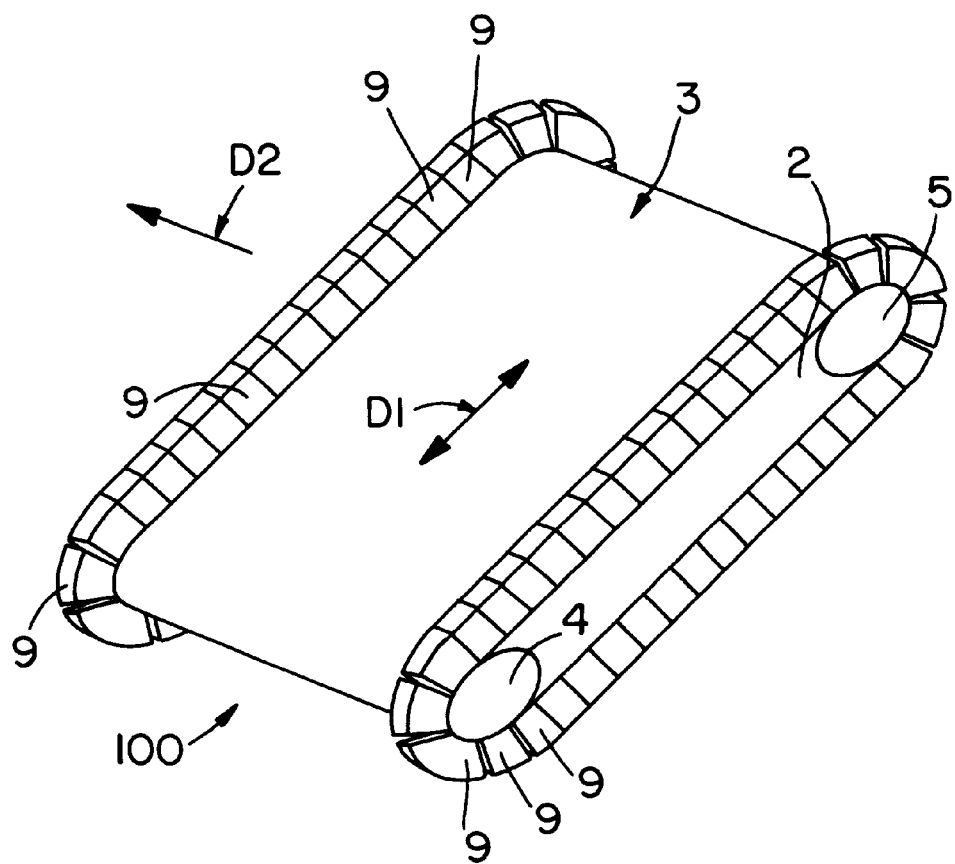
FIG. 4 is a simplified prospective view of yet another different form of embodiment according to the invention.

In other cases, especially where items of a certain weight and/or volume or of a rounded shape must be handled, the use of curbs of considerable height, say a few centimeters, and set-up at the edges of the mat may be considered. In this case, refer to the unit 100 shown in FIG. 4, wherein the curb is constituted by a row of separate, adjacently disposed sectors 9, so as to oppose a limited resistance to flexing when the mat passes-over the rollers.

The described solution prevents any slippages of items in a direction parallel to the sense of motion.

If the item to be sorted comes in contact with the curb 8 or 9 while being loaded on the carrying unit, two positive effects occur: a greater friction due to the material constituting the curb, and a slight inclination of the support (meaning a less than perfect contact with the mat), with the resulting elimination of adverse effects due to the presence of eventual air cushions.

Moreover, in case of a loading of items of a limp nature or of a size exceeding that of the mat, the curb prevents or reduces the item's contact with the fixed surfaces which may cause some resistance in the unloading phase, with a consequent rotation of the item and potential changes in its trajectory.

If the item comes in contact with the curb during the loading phase and tends to slip backward opposite the direction of motion D2 of the sorting unit, the curb acts as a restraining bank.

In essence, the invention envisions to provide a restraining element in the form of a curb oriented parallel to the direction of movement of the mat and capable of moving along with the mat, and to do this in a manner contrary to the known state of the art, which prior art involves the installation of a fixed bank or curb on the trolley frame.

It should lastly be noted that the application of the curb according to the invention also has a positive effect during the sorting of the items, thanks to the adherence it produces, which allows controlling the unloading trajectory of the items in a more accurate manner.

An expert in the art may envision numerous modifications and variants, all of which may however be considered to fall within the scope of this invention as defined by the appended claims.

What is claimed is:

1. A mobile sorting unit for conveying and sorting items, comprising:

a trolley frame arranged to be moved in a direction of motion;

an endless belt mounted on the frame for rotation in a cross direction extending transversely to the direction of frame motion, the belt including an outwardly facing surface for supporting items; and a motor mounted on the frame for rotating the belt;

the belt including at least one upstanding curb disposed on the outwardly facing surface of the belt for rotation with the belt, the curb extending in the cross direction, the upstanding curb having a coefficient of friction higher than the coefficient of friction of the outwardly facing surface.

2. The mobile sorting unit according to claim 1 wherein the at least one curb comprises a plurality of parallel curbs.

3. The mobile sorting unit according to claim 2 wherein the belt includes a pair of side edges, the curbs situated adjacent respective ones of the edges.

4. The mobile sorting unit according to claim 1 wherein the at least one curb is formed of a flexible high-friction material.

5. The mobile sorting unit according to claim 1 wherein the at least one curb comprises a row of adjacently disposed sectors.

6. The mobile sorting unit according to claim 1 wherein the belt includes a pair of side edges, the curb being disposed on the belt at a distance from the side edges.

* * * * *